May 12, 1931.  J. M. GWINN, JR  1,804,765
AIRCRAFT
Filed Feb. 27, 1929
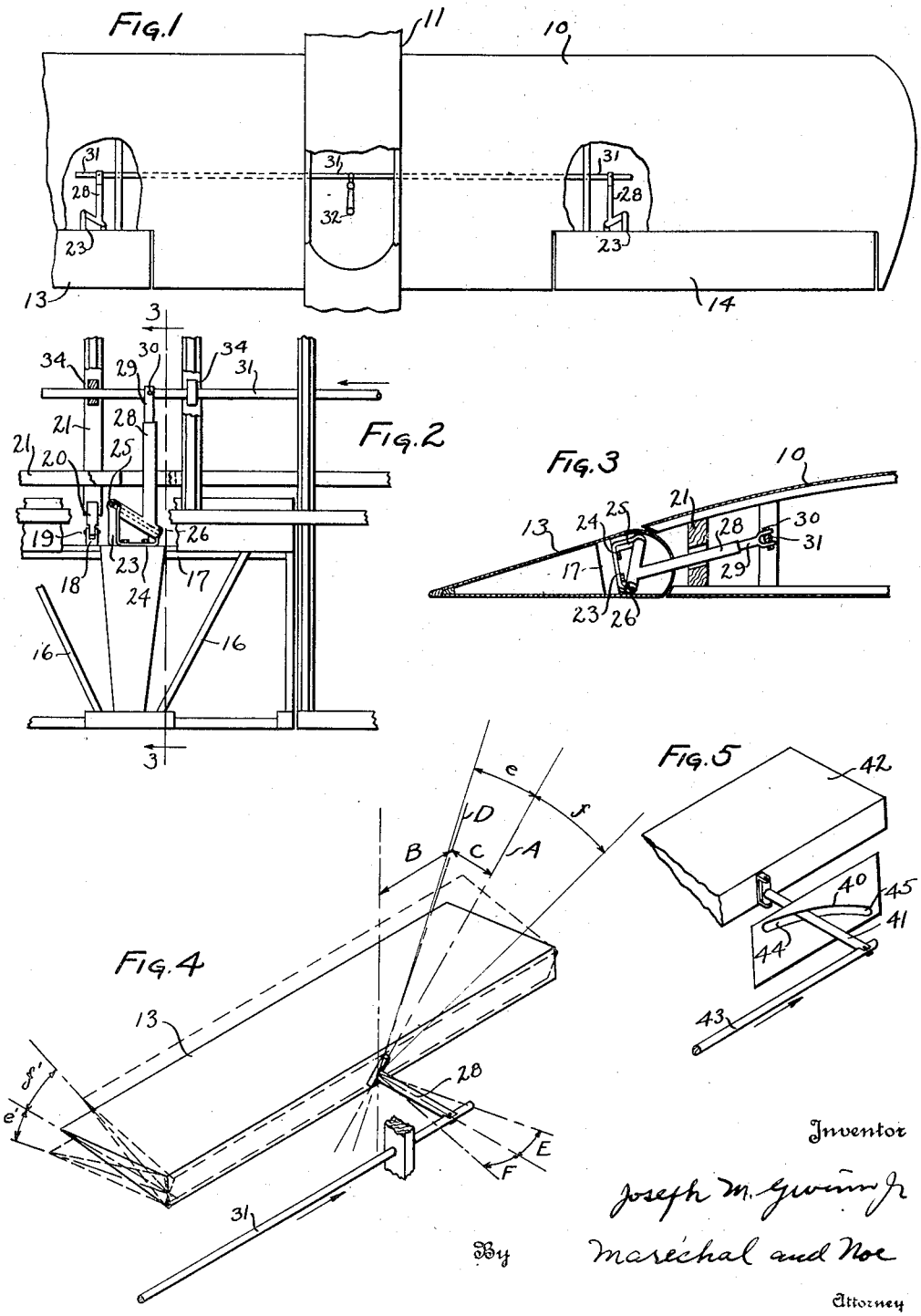

Patented May 12, 1931

1,804,765

UNITED STATES PATENT OFFICE

JOSEPH M. GWINN, JR., OF BUFFALO, NEW YORK, ASSIGNOR TO CONSOLIDATED AIRCRAFT CORPORATION, OF BUFFALO, NEW YORK, A CORPORATION OF DELAWARE

AIRCRAFT

Application filed February 27, 1929. Serial No. 343,212.

This invention relates to aircraft and more particularly to control systems for the control of ailerons or other airfoils.

One object of the invention is the provision of a simply constructed control system for an airfoil surface, having provision for moving the airfoil in a differential manner.

Another object of the invention is the provision of an airfoil or control surface having a lever pivoted thereto on an axis angularly related to the aileron axis, means being provided for moving the lever in a controlled manner to produce tilting movements of the aileron.

Other objects and advantages of the invention will be apparent from the following description and the accompanying drawings, in which—

Fig. 1 is a plan view of a portion of an airplane having an aileron control system embodying the present invention;

Fig. 2 is a plan view of a portion of the sustaining surface and associated aileron;

Fig. 3 is a section on the line 3—3 of Fig. 2;

Fig. 4 is a representation in diagrammatic perspective showing the operation of the present invention; and Fig. 5 is a view corresponding to Fig. 4 showing a modified form of construction.

Referring to the drawings more particularly by reference numerals, the same numerals designating like parts in the several views, 10 designates the sustaining surface of an aircraft, this surface extending laterally from both sides of the fuselage 11 as shown in Fig. 1. At the outer ends of the sustaining surface are ailerons 13 and 14, transversely pivoted along their front edges so that they may move to elevated or depressed positions relatively to the sustaining surfaces 10.

The aileron 13 is shown in Fig. 1 as embodying frame members 16 attached to the transverse aileron beam 17 located near its leading edge. Mounted on the aileron beam 17 are a series of spaced lugs 18 pivotally connected as by pins 19 to supports 20 suitably fixed to the frame 21 of the sustaining frame, the aligned axes of the pins 19 thus locating the aileron pivot axis.

Suitably fixed to the forward side of the aileron beam 17 is a pivot bracket 23 which is held in position by suitable bolts 24 or the like. This pivot bracket provides supporting arms 25 which carry a pivot pin or bolt 26 the axis of which extends angularly with relation to a line normal to the aileron through the aileron pivot axis. Preferably, when it is intended that the ailerons should have differential motions, one moving up a distance greater than the other moves down, the upper supporting arm 25 is located forwardly of the lower supporting arm and displaced laterally as shown in Fig. 2 so that the axis of the pivot pin 26 extends angularly with relation to any plane normal to the aileron. As will be more apparent from Fig. 4 the pivot pin axis is indicated by the line A, this axis being inclined to a line normal to the aileron through an angle B in front view and an angle C as viewed from the side.

Supported by the pivot pin 26 for rocking movements about the line A is a lever 28, preferably of hollow tubular construction, this lever being shown as extending forwardly from the aileron and enclosed in the rear portion of the sustaining plane 10. The lever 28 thus lies in a plane which is substantially common to the plane of the aileron where it will be out of the air flow and housed and protected in the sustaining surface. As shown in Figs. 2 and 3 the lever 28 may be formed of two telescopic tubes, the forward tube 29 being articulated by a bolt 30 or the like to a connecting member 31 shown in the form of a reciprocatory rod extending substantially parallel to the aileron axis and passing to the fuselage or other control station where it is connected to the control member 32 shown in the form of the usual control stick. Tilting movement of the control stick 32 in a lateral direction causes endwise movement of the rod 31 and this swings the lever 28 from its normal position indicated in Fig. 2. If there were no restraint guiding the movements of the lever 28 or rod 31 the lever 28 would move about its pivotal connection to the bracket 23 without affecting the aileron. However, in accordance with this invention guide means are provided for controlling the movement of the lever, the forward end of the lever or the rod 31 being guided so that they can only move in a lateral direction, movements of these parts in directions normal to the aileron or sustaining surface being prevented. As one form of guide means guide surfaces 34 through which the rod 31 extends may be employed to permit only lateral swinging of the lever 28. If the rod 31 is moved to the left from its position shown in Fig. 2 it will now be apparent that swinging movement of the lever 28 will cause a tilting movement of the axis of the pivot pin 26, thus producing a downward movement of the aileron. Tilting movement of the aileron necessarily results upon such movement of the connection rod 31 as the lever 28 cannot move down due to its restraint, therefore the aileron moves downward instead.

Referring again to Fig. 4, if it is desired that equal angular movement to both sides of the normal position of the aileron should be caused by equal degrees of movement of the control rod, the line A may coincide with the line D, and in such case the axis of the pivot pin 26 would lie in a plane normal to the aileron through the aileron axis but angularly related to a line normal to the aileron. With an arrangement as just mentioned the control rod 31 if moved to the right as viewed in Fig. 4 causes a downward tilting movement of the aileron from its normal position shown in full lines, this movement being equal to the movement which would obtain if the rod were moved the same amount to the left for raising the aileron. Preferably, however, the arrangement is such that the aileron travels upwardly through a greater angular movement than it travels downwardly from normal with the same degree of motion of the control rod 31. It is desirable in the operation of aileron surfaces to have such a differential movement so that the aileron on the side of the airplane traveling more slowly will have substantially the same effective force as the aileron on the opposite side which travels faster, when making a turn for example, and the full effect of both ailerons is thus obtained. This differential movement of the aileron on opposite sides of the airplane results when the pivot axis 26 corresponds to the line A, see Fig. 4. The movement of the rod 31 to the right moves the lever 28 through an angle E thus tilting the pivot axis through an angle $e$ and moving the aileron downwardly through an angle $e'$. However, when the control rod 31 is moved to the left an equal amount, and the lever 28 swings through an angle F equal to the angle E the axis of the pivot pin 26 swings forwardly through an angle $f$ and the aileron moves upwardly through an angle $f'$, the angle $f'$ being considerably larger than the angle $e'$.

The two ailerons are interconnected as previously mentioned by the control rods 31, the control system for the aileron 14 being similar in construction to that described with reference to aileron 13. It will therefore be apparent as one aileron moves down from normal through angle $e'$ the opposite aileron will move up through a larger angle $f'$. The construction by which this is accomplished, as will be apparent, is quite simple and dependable, and the interconnection between the ailerons and the control member 32 is in effect a positive interconnection.

Fig. 5 shows a modified form of construction in which the control of the movements of the lever which operates the aileron is effected by means of a guide fixed preferably within the wing 10 and having a guide slot 40. In this form of construction the lever 41 may be pivoted to the aileron 42 on an axis which is at an angle of 90 degrees to the aileron axis and normal to the aileron, and the end of the lever 41 is connected by an operating rod or the like 43 which may be moved endwise to cause lateral swinging movement of the lever 41. As shown the rod 43 extends substantially parallel to the aileron axis and may be operated by a control member similar to the control member 32 of Fig. 1. The slot 40 which guides the lever 41 is provided with guide surfaces 44 and 45, the guide surface 44 inclining laterally while guide surface 45 inclines downwardly preferably more rapidly than the slot 44 so that movement of the rod 43 to the right as viewed in this figure causes greater downward movement of the lever 41 than corresponding movements of rod 43 to the left. The aileron is thus caused to move upwardly through greater degrees of movement than it moves downwardly for the same displacement of the control rod 43.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An aileron control system comprising a control member, an aileron, a pivotal support therefor, a lever, a bracket fixed to said aileron and providing a pivotal support mounting one end of said lever for rocking movement about an axis inclined to planes normal to the aileron, an interconnection between the said control member and the other end of said lever, and means restraining said lever for movement in a plane substantially coinciding with the plane of the aileron, equal movements of the interconnection producing unequal angular movements of the aileron about the aileron axis from a normal position.

2. An aileron control system comprising a control member, an aileron, a pivotal support therefor, a lever pivoted to said aileron on an axis angularly related to planes normal to the aileron, a reciprocatory rod interconnecting said lever and said control member and extending substantially parallel to the aileron axis, and guide means confining the movements of the lever to a plane substantially coinciding with the plane of the aileron so that equal movements of said rod from a normal position cause differential angular movements of the aileron.

3. An aileron control system comprising a control member, an aileron, a pivotal support therefor, a lever pivoted to said aileron on an axis angularly related to planes normal to the aileron, a reciprocatory rod interconnecting said lever and said control member and extending substantially parallel to the aileron axis, a sustaining plane to which said aileron is pivoted, said rod and lever being housed within said sustaining plane, and guide means confining the movements of the lever to a plane substantially coinciding with the plane of the aileron so that equal movements of said rod from a normal position cause differential angular movements of the aileron.

4. An aileron control system comprising a control member, an aileron, a pivotal support therefor, a lever pivoted to said aileron on an axis angularly related to the aileron axis, a reciprocatory rod interconnecting said lever and said control member and extending substantially parallel to the aileron axis, a sustaining plane to which said aileron is pivoted, said rod and lever being housed within said sustaining plane, and guide means confining the movements of the lever to a plane substantially coinciding with the plane of the aileron.

In testimony whereof I hereto affix my signature.

JOSEPH M. GWINN, Jr.